US011940025B2

(12) United States Patent
Adamczak et al.

(10) Patent No.: US 11,940,025 B2
(45) Date of Patent: Mar. 26, 2024

(54) FRICTION ASSEMBLY FOR A DISC BRAKE SYSTEM ABLE TO FILTER A GASEOUS PHASE RESULTING FROM THE FRICTION OF A LINING

(71) Applicant: TALLANO TECHNOLOGIE, Boulogne Billancourt (FR)

(72) Inventors: Loic Adamczak, Montalieu Vercieu (FR); Christophe Rocca-Serra, Paris (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 708 days.

(21) Appl. No.: 17/053,464

(22) PCT Filed: Apr. 24, 2019

(86) PCT No.: PCT/FR2019/050968
§ 371 (c)(1),
(2) Date: Nov. 6, 2020

(87) PCT Pub. No.: WO2019/215402
PCT Pub. Date: Nov. 14, 2019

(65) Prior Publication Data
US 2021/0239168 A1 Aug. 5, 2021

(30) Foreign Application Priority Data
May 9, 2018 (FR) .................. 18 53966

(51) Int. Cl.
B60T 8/00 (2006.01)
B01D 53/00 (2006.01)
(Continued)

(52) U.S. Cl.
CPC ....... F16D 65/0031 (2013.01); B01D 53/002 (2013.01); B01D 53/0415 (2013.01);
(Continued)

(58) Field of Classification Search
CPC .... F16D 65/0031; F16D 65/092; F16D 55/22; F16D 2069/004; B01D 53/002;
(Continued)

(56) References Cited

U.S. PATENT DOCUMENTS 5,162,053 A 11/1992 Kowalski, Jr.
6,749,655 B2 6/2004 Dautenhahn
(Continued)

FOREIGN PATENT DOCUMENTS

CN 1647601 A 7/2005
CN 205402964 U 7/2016
(Continued)

OTHER PUBLICATIONS

Office Action issued in Chinese Patent Application No. 201980041555.1 dated Nov. 3, 2021.
(Continued)

Primary Examiner — Christopher P Schwartz
(74) Attorney, Agent, or Firm — NIXON & VANDERHYE

(57) ABSTRACT

A friction assembly for a brake system able to collect vapors resulting from the friction of a lining. The friction assembly for a disc brake system includes: —a lining made of friction material, including a friction face, an attachment face opposite the friction face, and a collection groove that is open on the friction face; —a sole plate, supporting the lining, including a hole; —a negative pressure source configured to create negative pressure in the collection groove and the hole. The friction assembly includes a gas filtration device, in pneumatic communication with the collection groove and the hole, able to collect gases resulting from friction of the lining and coming from the collection groove.

19 Claims, 2 Drawing Sheets

(51) Int. Cl.
  *B01D 53/04* (2006.01)
  *F16D 65/00* (2006.01)
  *F16D 65/092* (2006.01)
  *F16D 69/00* (2006.01)

(52) U.S. Cl.
  CPC ........... *F16D 65/092* (2013.01); *F16D 69/00* (2013.01); *B01D 2253/102* (2013.01); *B01D 2253/104* (2013.01); *B01D 2253/106* (2013.01); *B01D 2253/108* (2013.01); *B01D 2257/402* (2013.01); *B01D 2257/404* (2013.01); *B01D 2257/504* (2013.01); *B01D 2257/7022* (2013.01); *B01D 2257/7025* (2013.01); *B01D 2259/4566* (2013.01); *F16D 2069/004* (2013.01)

(58) Field of Classification Search
  CPC ......... B01D 53/0415; B01D 2253/102; B01D 2253/104; B01D 2253/106; B01D 2253/108; B01D 2257/402; B01D 2257/504; B01D 2257/7022; B01D 2257/7025; B01D 2259/4566
  USPC .......................................... 188/218 A, 218 R
  See application file for complete search history.

(56) References Cited

U.S. PATENT DOCUMENTS

| | | | |
|---|---|---|---|
| 11,353,073 | B2 * | 6/2022 | Adamczak .......... F16D 65/0031 |
| 11,828,340 | B2 * | 11/2023 | Eichner ................. F16D 55/22 |
| 2006/0230729 | A1 * | 10/2006 | Tabrizi ................. E01H 1/0836 |
| | | | 55/385.3 |
| 2008/0029357 | A1 | 2/2008 | Krantz |
| 2011/0023719 | A1 | 2/2011 | Kidman et al. |
| 2014/0116824 | A1 | 5/2014 | Jakubowski et al. |
| 2015/0001013 | A1 * | 1/2015 | Mennie .................... B60T 5/00 |
| | | | 188/73.1 |
| 2020/0278002 | A1 * | 9/2020 | Bock .................... B01D 46/106 |

FOREIGN PATENT DOCUMENTS

| | | | | |
|---|---|---|---|---|
| DE | 19846887 C2 * | 11/2000 | ......... F16D 65/0031 |
| DE | 203 08 576 U1 | 12/2003 | |
| EP | 2 725 255 A1 | 4/2014 | |
| FR | 3034831 | 10/2016 | |
| FR | 3057040 | 4/2018 | |
| JP | H11-505580 A | 5/1999 | |
| JP | 2006-526088 A | 11/2006 | |
| JP | 2010-221878 | 10/2010 | |
| JP | 2017-505543 A | 2/2017 | |
| JP | 2017-100097 A | 6/2017 | |
| WO | 96/29141 A1 | 9/1996 | |
| WO | 2008/049829 A1 | 5/2008 | |
| WO | 2015/112243 A1 | 7/2015 | |
| WO | 2018/065541 A1 | 4/2018 | |

OTHER PUBLICATIONS

Office Action issued in European Patent Application No. 19 726 063.1, dated Oct. 31, 2022.
Office Action issued in Chinese Patent Application No. 201980041555.1 dated Jul. 20, 2022.
Office Action issued in Japanese Patent Application No. 2020-562674 dated Mar. 6, 2023.
International Search Report for PCT/FR2019/050968 dated Jun. 26, 2019, 2 pages.

* cited by examiner

ND
FRICTION ASSEMBLY FOR A DISC BRAKE SYSTEM ABLE TO FILTER A GASEOUS PHASE RESULTING FROM THE FRICTION OF A LINING

This application is the U.S. national phase of International Application No. PCT/FR2019/050968 filed Apr. 24, 2019 which designated the U.S. and claims priority to FR 18 53966 filed May 9, 2018, the entire contents of each of which are hereby incorporated by reference.

FIELD OF THE INVENTION

The present invention relates to vehicles, in particular automobiles and also railway rolling stock. More specifically, the invention relates to the braking of vehicles and railway rolling stock. The invention further relates to brake pads for friction assemblies for disc brake systems for such vehicles and rolling stock.

One will note that the invention is equally applicable in drum brake systems as well as in block brake systems, for example in the railway sector. The invention may also be implemented in industrial brakes, for example such as for wind turbines or elevators.

One will note that according to the invention, the vehicle may be of any type and in particular may be a car, a truck, a tractor, a coach, or a bus. Likewise, the rolling stock may be a train, a tram, or even a subway.

More particularly, the invention relates to non-polluting friction assemblies for a disc brake system. The invention thus relates to combating polluting emissions during friction due to braking.

TECHNOLOGICAL BACKGROUND OF THE INVENTION

Vehicles or rolling stock almost always include a braking system. The braking system may in particular be a disc brake system. The braking system then comprises a disc integral with a wheel or axle of the vehicle or of the rolling stock. Thus, when the wheel or axle begins to rotate to enable the vehicle or rolling stock to move, the disc also rotates.

This is why, in order to brake the vehicle or the rolling stock, the disc brake system comprises friction means for the disc. The friction means comprise in particular two sole plates which each carry a lining comprising a friction material. The friction material is configured to come into contact with the disc. The two sole plates carrying the friction linings are positioned one on each side of the disc so as to grip it between them when the brake system is actuated.

However, when the friction lining comes into contact with the disc while the latter is rotating, the frictional force is such that the friction material, but also the disc, emit particles harmful to the environment. The braking systems are therefore polluting.

This is why it is known practice to arrange a device to suction particles resulting from braking in the braking system. The suction device is intended to suction the brake particles shortly after their emission. These devices are generally relatively efficient. However, they are not able to make disc brake systems completely non-polluting.

OBJECT OF THE INVENTION

An object of the invention is to provide a friction assembly for a disc brake system that is even less polluting.

BRIEF SUMMARY OF THE INVENTION

To do this, according to the invention, a friction assembly for a disc brake system is provided, comprising:
a lining made of friction material, comprising a friction face, an attachment face opposite the friction face, and a collection groove that is open on the friction face,
a sole plate, supporting the lining, comprising a hole in pneumatic communication with the collection groove,
a negative pressure source configured to create negative pressure in the collection groove and the hole,
characterized in that the friction assembly comprises a gas filtration device, in pneumatic communication with the collection groove and the hole, capable of capturing gases resulting from the friction of the lining and coming from the collection groove.

Thus, the gas filtration device makes it possible to filter a gaseous phase produced during friction of the lining on the disc. The gas filtration device makes it possible in effect to capture gases comprised in this gaseous phase.

The inventors have observed that during braking, the temperature at the interface between the friction lining and the disc is often at least equal to 300° C., and that the atmosphere around this zone is oxidizing. Thus, in addition to the solid particles emitted, a gaseous phase is also produced during braking. Part of this gaseous phase remains in gas form and can pollute the environment of the vehicle. Another part of this gaseous phase condenses in the environment of the vehicle, which can foul portions of the vehicle, or condense outside the vehicle, which generates solid pollution in essentially nanoparticulate form.

Thus, the friction assembly according to the invention makes it possible to collect pollutant gases by filtering the gaseous phase emitted during braking and therefore to prevent these gases from being released into the atmosphere. Indeed, these gases reach the collection groove, pass through the hole in the sole plate, and are captured by the gas filtration device. The gas filtration device may in particular be a filter which allows air to pass through. The invention therefore makes it possible to reduce the pollution generated by actuation of a disc brake system comprising the friction assembly as described above. The friction assembly according to the invention is therefore less polluting.

In addition, in various embodiments of the invention, it is also possible to make use of one or more of the following arrangements:
the gas filtration device comprises activated carbon; the activated carbon thus can capture gases resulting from friction while allowing air to pass through;
the activated carbon may be physically or chemically activated; ideally, the activated carbon comprises a portion of physically activated carbon and a portion of chemically activated carbon;
the gas filtration device comprises a mass of zeolite;
the gas filtration device comprises a mass of silica;
the gas filtration device comprises a mass of alumina;
the gas filtration device comprises a canister;
the gas filtration device is capable of capturing gaseous carbon dioxide;
the gas filtration device is capable of capturing gaseous methane;
the gas filtration device is capable of capturing gaseous nitrogen oxide;
the gas filtration device is capable of capturing gaseous nitrogen dioxide;
the gas filtration device is capable of capturing gaseous ethane;

the gas filtration device is capable of capturing gaseous phenol;

the gas filtration device is capable of capturing a gaseous hexanol;

the gas filtration device is capable of capturing gaseous heptane;

the gas filtration device is able to capture gaseous cyclopentanone;

the gas filtration device is able to capture a gaseous alkene, the friction assembly therefore being less polluting;

the friction assembly comprises a particulate filter in pneumatic communication with the collection groove and the hole, configured to filter air coming from the collection groove; the particulate filter makes it possible to capture solid particles which have a macroscopic and microscopic dimension;

the particulate filter is pneumatically positioned between the collection groove and the filtration device; air purified of particles having a macroscopic and microscopic dimension thus reaches the filtration device, which makes it possible to protect the integrity of the filtration device;

the friction assembly comprises means for condensing the gases resulting from friction of the lining; the gases can thus be captured in the liquid state, or even in the solid state;

the means for condensing the gases resulting from friction of the lining comprise a plate heat exchanger;

the plate heat exchanger is adapted to be supplied with a refrigerant fluid;

the refrigerant fluid is a refrigerant fluid intended for air conditioning a vehicle comprising the friction assembly;

the friction assembly is connected to an air conditioning system of the vehicle;

the means for condensing the gases resulting from friction of the lining are pneumatically positioned between the collection groove and the particulate filter;

the lining comprises a rear edge, located on the side where the disc is able to exit from an interface with the pad when the disc rotates in the direction of travel of the vehicle, and a front edge, the collection groove being positioned near the rear edge; the capture of gases is therefore all the more efficient;

the collection groove is positioned at a distance from the rear edge that is less than or equal to 5 millimeters, 10 millimeters, 15 millimeters, or 20 millimeters.

Also provided according to the invention is a disc brake system comprising:

a friction assembly as described above, comprising two linings of friction material and two sole plates respectively supporting one of the two linings, and a disk, such that the two linings of friction material are positioned one on each side of the disc.

Finally, according to the invention, a vehicle is provided comprising a disc brake system as described above.

BRIEF DESCRIPTION OF THE DRAWINGS

An embodiment of the invention will now be described as a non-limiting example, with the aid of the following figures.

DETAILED DESCRIPTION OF AN EMBODIMENT OF THE INVENTION

One will note that for the sake of clarity, only the elements useful to understanding the described embodiments have been represented and will be detailed.

In addition, unless otherwise specified, the expressions "substantially", "approximately", etc. mean that a slight variation from the nominal value concerned is possible, in particular by a small percentage, specifically to within 10%.

Figure 1:
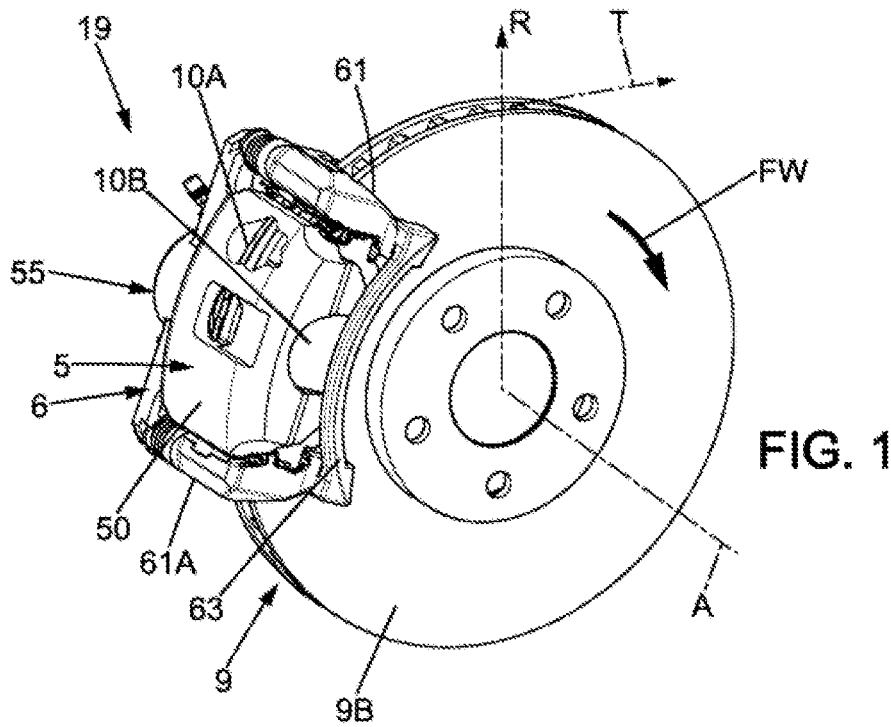
FIG. 1 shows a perspective view of a disc brake system comprising a friction assembly according to one embodiment of the invention.
Figure 2:
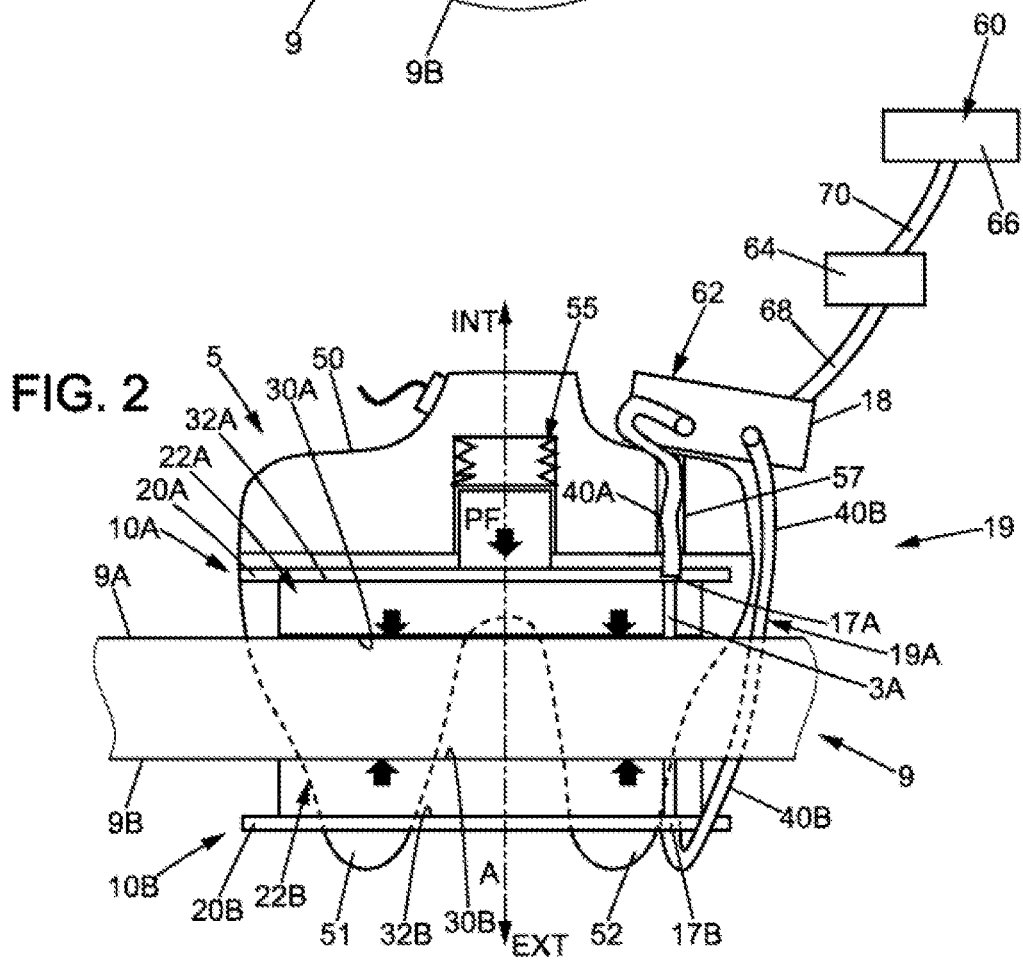
FIG. 2 shows this disc brake system, viewed from an axis perpendicular to a main plane of a disc of the disc brake system.

Represented in FIGS. 1 and 2 is a disc brake system 19 according to the invention, for a vehicle. In this embodiment the vehicle is a motor vehicle, here a light duty vehicle. However, one will note that the invention can be implemented for any type of vehicle, such as a tractor truck for a semi-trailer, a bus, a coach, or an agricultural tractor, or for any type of rolling stock, such as a locomotive or a wagon of a train for transporting people, goods, a subway, or a tram. The invention may also be implemented for industrial brakes, for example for wind turbines or elevators.

The disc brake system 19 according to the invention comprises a disc 9, of axis A, integral with a wheel of the vehicle. The axis A thus extends perpendicularly to the disc 9 and passes through a center of the disc 9.

The disc 9 has a side face 9A and an opposite side face 9B. The side faces 9A, 9B are perpendicular to the axis A. The disc 9 is also connected to a transmission mechanism, for example in particular by means of a hub, itself connected to a vehicle engine. The transmission mechanism thus makes it possible to transmit a rotational movement about the axis A to the wheel of the vehicle, by means of the disc 9, in order to move the vehicle.

In addition, the disc brake system 19 comprises a caliper 5 which grips a portion of the disc 9 in a sandwich. As illustrated in particular in FIG. 2, the caliper 5 is in the form of a main body 50 which has a general U-shape so as to grip the disc 9. In addition, the main body 50 has a cavity for accommodating a piston 55. The caliper 5 also has two fingers 51, 52. The piston 55 is capable of exerting a force PF in a direction which is parallel to the axis A of the disc, and does so when the disc brake system 19 is actuated by a driver of the vehicle.

In FIG. 1, a rotation direction FW of the disc 9 is represented which corresponds to a forward motion of the vehicle. Also represented is a direction T tangential to a circumference of the disc 9.

Also defined is a rear side and an opposite front side. The rear side corresponds to the side where the disc 9 exits the interface with the caliper 5 when the disc 9 rotates in the direction of travel of the vehicle. The front side is the opposite side and corresponds to the side where the disc 9 enters the interface with the caliper 5 when the disc 9 rotates in the direction of travel of the vehicle. In addition, a direction which is oriented from the inside to the outside is defined for a radial direction R oriented from the axis A towards the circumference of the disc 9.

The disc brake system 19 comprises a caliper bracket 6 which is attached to a member of the vehicle. This member may in particular be a control arm of the vehicle. In addition, the caliper bracket 6 comprises two bridges 61, 61A positioned at two longitudinal ends, respectively rear and front, of the caliper 5, and a connecting arch 63 which connects the two bridges 61, 61A. Bridge 61 is thus a rear bridge and bridge 61A is a front bridge.

The disc brake system 19 also comprises a friction assembly 19A which comprises in particular two brake pads 10A, 10B housed in the caliper 5. The two brake pads 10A, 10B are arranged one on each side of the disc 9. Brake pad 10A is arranged facing side face 9A of the disc 9. Brake pad 10B is arranged facing side face 9B of the disc 9. Thus, the two brake pads 10A, 10B are arranged symmetrically relative to a plane containing the disc 9 and perpendicular to the axis A of the disc 9.

The piston 55 of the caliper 5 is arranged to exert force PF on the brake pad 10A so that the two pads 10A, 10B come into contact with the disc 9 in a manner that brakes the vehicle when the disc brake system 19 is actuated by a driver of the vehicle. Note that in the example illustrated, the caliper 5 is mounted to be "floating" in the caliper bracket 6, along the axis A. The caliper 5 can thus move parallel to the axis A, in particular to compensate for progressive wear of the pads 10A, 10B. On the other hand, the caliper 5 is kept integral with the caliper bracket 6 along the other potential translations and rotations. The floating assembly is usually achieved by means of slide pins along axis A.

Figure 3:
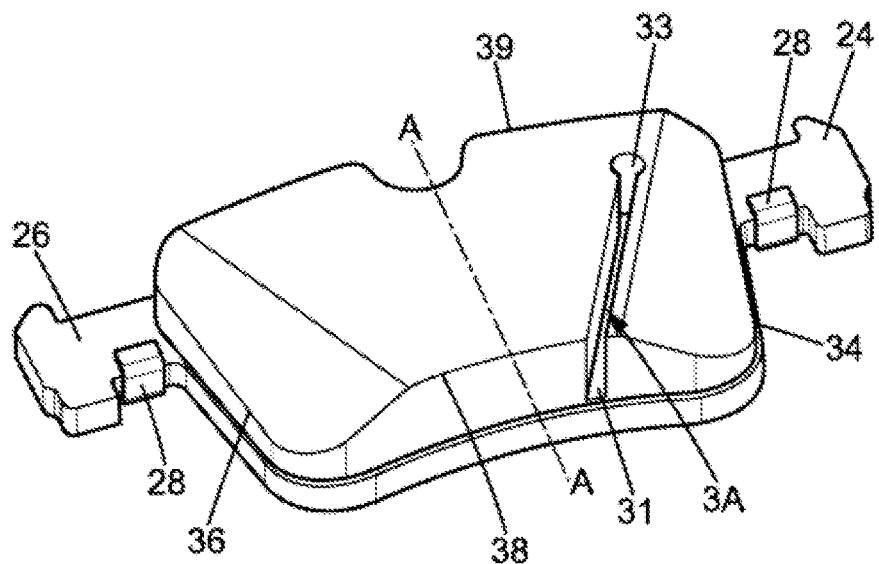
FIG. 3 illustrates a perspective view of a brake pad of the disc brake system, and FIG. 4 schematically shows a particular arrangement of a particulate filter and a filtration device of the brake system according to one variant.

The brake pads 10A, 10B have identical structures. They each comprise a respective sole plate 20A, 20B which supports a respective friction lining 22A, 22B. Only brake pad 10A is shown in FIG. 3; brake pad 10B is similar, however.

The sole plates 20A, 20B, sometimes called back plates, are in the form of a solid metal plate and of substantially constant thickness. This thickness may in particular be between 3 and 5 millimeters. The general shape of the face of the sole plates 20A, 20B is rectangular, but with a curvature which follows the curvature of the side face 9A, 9B of the disc 9 on which the friction linings 22A, 22B will exert their force.

The sole plates 20A, 20B also include means for attachment to the main body 55 of the caliper 5. Here, these means comprise a rear arm 24 and a front arm 26 which allow the sole plate 20A, 20B to be fixed to the main body 55 of the caliper 5 by means of hooks 28. In addition, the sole plates 20A, 20B have an attachment face to which the respective friction lining 22A, 22B is attached.

The friction linings 22A, 22B are in the form of a body of friction material capable of coming into contact with the side face 9A of the disc 9 in order to brake the vehicle. The friction material is sometimes referred to as "ferodo".

The friction linings 22A, 22B therefore comprise a respective friction face 30A, 30B intended to come into direct contact with the side face 9A, 9B of the disc 9. The friction linings 22A, 22B also include a respective attachment face 32A, 32B, opposite to the friction face 30A, 30B, and attached directly to the attachment face of the sole plate 20.

In addition, with reference to the previously defined sides, the friction linings 22A, 22B have a rear edge 34 and an opposite front edge 36. The friction linings 22A, 22B also have a radially inner edge 38 and outer edge 39.

When the disc brake system 19 is actuated, the contact between the friction faces 30A, 30B of the friction linings 22A, 22B of the brake pads 10A, 10B and the side faces 9A, 9B of the disc 9 generates the emission of braking particle pollutants. These braking particles correspond to particles of the friction material which are detached from the friction linings 22A, 22B by abrasion with the side faces 9A, 9B of the disc 9, as well as to particles in the solid state which are detached from the disc 9. In addition, a gaseous phase is emitted during this friction when braking.

This gaseous phase comprises in particular at least one of the following compounds, depending on the composition of the friction lining, the braking temperature, and the atmospheric conditions in which the braking takes place: carbon dioxide, methane, nitrogen oxide, nitrogen dioxide, ethane, phenol, hexanol, heptane, cyclopentanone, and alkene. This gaseous phase also comprises other compounds in much smaller amounts, such as styrene for example.

In addition, when part of this gas phase condenses, inside or outside the vehicle, it causes the release of highly volatile nanometric particles. These solid particles and this gaseous phase are pollutants and are harmful to human health and can also damage or soil parts of the vehicle. The portion of this gaseous phase which does not condense causes atmospheric pollution, as does the portion which condenses and then forms a cloud of nanoparticles.

This is why the friction assembly 19 of the disc brake system 19 comprises pollution control means, described below.

The friction linings 22A, 22B have a respective collection groove 3A, 3B. The collection grooves 3A, 3B are open on the respective friction faces 30A, 30B and are arranged near the respective rear edge 34 of the friction linings 22A, 22B. Thus, during forward motion of the vehicle, the solid braking particles and the emitted gaseous phase are mechanically drawn towards the collection grooves 3A, 3B, which makes it possible to improve the efficiency of the collection. When the vehicle is braked during its forward motion, the solid braking particles and the gaseous phase are in fact emitted frontward FW, with reference to the forward motion of the vehicle. The capture of solid braking particles and of gases resulting from braking is thus all the more effective when the collection grooves 3A, 3B are arranged near the rear edge 34 of the friction linings 30A, 30B. Thus, in general, the collection grooves 3A, 3B are arranged at a distance from the rear edge 34 of less than or equal to 5 millimeters, 10 millimeters, 15 millimeters, 20 millimeters, 30 millimeters, or 50 millimeters.

In addition, the collection grooves 3A, 3B are unique, substantially rectilinear, and continuous. They are of constant width. In addition, the collection grooves 3 are directly hollowed out in the friction material, all the way to the sole plates 20A, 20B.

Furthermore, the collection grooves 3A, 3B extend between an open end 31 and a blind end 33. The open end 31 is arranged on the inner edge 38 of the friction lining 22A, 22B. The blind end 33 is arranged near the outer edge 39. Of course, the open end 31 could also be arranged on the outer edge 39. The blind end 33 could also be arranged near the inner edge 38.

The sole plates 20A, 20B each have a respective hole 17A, 17B which opens into the collection groove 3A, 3B. The holes 17A, 17B are substantially opposite a respective blind end 33. The holes 17 may more generally be arranged near the blind end 33. Hole 17A is thus in pneumatic communication with collection groove 3A. Similarly, hole 17B is in pneumatic communication with collection groove 3B.

In addition, as illustrated in FIG. 2, the disc brake system 19 comprises two flexible tubes 40A, 40B.

Flexible tube 40A is connected to hole 17A of sole plate 20A of brake pad 10A. This tube 40A passes through the main body 55 of the caliper 5. To do so, the main body 55 of the caliper 5 has a through-channel 57.

Flexible tube 40B is connected to hole 17B of sole plate 20B of brake pad 10B. Flexible tube 40B bypasses the main body 55 of the caliper 5. Of course, according to one variant, flexible tube 40B may also pass through the main body 55 of the caliper 5, via a dedicated channel.

Thus, flexible tube 40A is in pneumatic communication with hole 17A and collection groove 3A. Flexible tube 40B is in pneumatic communication with hole 17B and collection groove 3B.

The friction assembly 19A further comprises a pollution control device 60 in pneumatic communication with the flexible tubes 17A, 17B as illustrated in FIG. 2. The pollution control device 60 has the function of reducing the pollution emitted during braking.

The pollution control device 60 thus comprises a particulate filter 62, a filtration device 64, and a suction source 66 which is for example in the form of a turbine. The particulate filter 62 is in pneumatic communication with the holes 17A, 17B and therefore the collection grooves 3A, 3B via the flexible tubes 40A, 40B. The particulate filter 62 is in pneumatic communication with the filtration device 64 by means of a flexible tube 68. Finally, the filtration device 64 is in pneumatic communication with the suction source 66 by means of a flexible tube 70. The particulate filter 62 is thus pneumatically positioned between the collection grooves 3A, 3B and the filtration device 64.

Thus, all of the abovementioned elements are in pneumatic communication. In particular, the filtration device 64 is in pneumatic communication with the holes 17A, 17B and the collection grooves 3A, 3B. In addition, the suction source 66 is therefore configured to create negative pressure in the collection grooves 3A, 3B and in the holes 17A, 17B.

The particulate filter 62 is configured to filter, from the air coming from the collection grooves 3A, 3B and having passed through the holes 17A, 17B and the flexible tubes 40A, 40B, solid particles having micrometric or millimetric dimensions, or even centimetric.

The function of the filtration device 64 is to capture comprised gases in the gaseous phase resulting from friction of the brake linings 22A, 22B on the disc 9, and having reached the collection grooves 3A, 3B, passed through the holes 17A, 17B, the flexible tubes 40A, 40B, and the particulate filter 62. To do this, the filtration device 64 preferably comprises activated carbon which advantageously comprises a portion of physically activated carbon and a portion of chemically activated carbon. The filtration device 64 may also include a canister. The canister and activated carbon are configured to capture at least one of the following compounds in the gaseous state: carbon dioxide, methane, nitrogen oxide, nitrogen dioxide, ethane, phenol, hexanol, heptane, cyclopentanone, and alkene.

According to a variant of the present embodiment, the pollution control device 60 comprises means for condensing gases resulting from the friction of the linings 22A, 22B. These means advantageously comprise a plate heat exchanger which may be supplied with a refrigerant fluid which is a refrigerant fluid of an air conditioning system of the vehicle. The pollution control device 60 is thus able to condense gases emitted during braking and to store them in the liquid state or even in the solid state. The means for condensing gases resulting from the friction of the linings 22A, 22B are pneumatically positioned between the collection groove 3A, 3B and the particulate filter 62. Only the gaseous phase therefore reaches the filtration device 64.

Thus, during braking, the negative pressure source 66 is actuated and the gaseous phase and solid particles emitted from the linings 22A, 22B and the disc 9 reach the collection grooves 3A, 3B, the holes 17A, 17B, the flexible tubes 40A, 40B, and the particulate filter 62 where the solid particles are captured. Then, the gaseous phase continues to travel in tube 68 towards the filtration device 64 where it is filtered. Gases from the gaseous phase are thus captured. The filtered gaseous phase can thus be released into the atmosphere.

The friction assembly 19A and consequently the braking system 19 are therefore less polluting.

Numerous modifications may of course be made to the invention without departing from the scope thereof.

The friction assembly 19A may in particular comprise only the filtration device 64 and not the particulate filter 62.

In addition, the particulate filter 62, the filtration device 64, and the negative pressure source 66 are shared by the brake pads 10A, 10B. It is also possible to provide a particulate filter 62, a filtration device 64, and a negative pressure source 66 specific to brake pad 10A and brake pad 10B.

Figure 4:
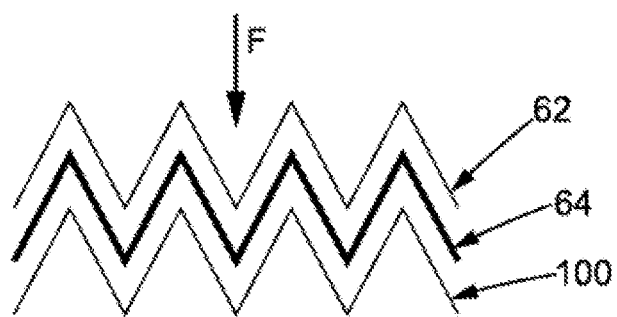

It is also possible to vary the arrangement of the particulate filter 62 and of the filtration device 64 intended to filter the gaseous phase. Represented in particular in FIG. 4 is a possible and more compact arrangement than the one previously illustrated. This figure indicates with the arrow F a direction of the gaseous phase coming from the collection groove 3A, 3B. The particulate filter 62 and the filtration device 64 are in the form of a thin layer of material. The particulate filter 62 and the filtration device 64 are thus positioned one on top of the other and in addition on a support layer 100. The filtration device 64 is thus positioned between the support layer 100 and the particulate filter 62.

The invention claimed is:

1. Friction assembly for a brake system, comprising:
    a lining made of friction material, comprising a friction face, an attachment face opposite the friction face, and a collection groove that is open on the friction face,
    a sole plate, supporting the lining, comprising a hole in pneumatic communication with the collection groove,
    a negative pressure source configured to create negative pressure in the collection groove and the hole,
    wherein the friction assembly comprises a gas filtration device, in pneumatic communication with the collection groove and the hole, the gas filtration device being capable of capturing gases resulting from the friction of the lining and coming from the collection groove, the friction assembly further comprising means for condensing gases resulting from friction of the lining.

2. The friction assembly according to claim 1, wherein the gas filtration device comprises activated carbon and/or a mass of zeolite and/or a mass of silica and/or a mass of alumina.

3. The friction assembly according to claim 2, wherein the gas filtration device comprises a canister.

4. The friction assembly according to claim 2, wherein the filtration device is capable of capturing gases of carbon dioxide and/or methane and/or nitrogen oxide and/or nitrogen dioxide and/or ethane and/or phenol and/or hexanol and/or heptane and/or cyclopentanone and/or an alkene.

5. The friction assembly according to claim 2, comprising a particulate filter in pneumatic communication with the collection groove and the hole, configured to filter air coming from the collection groove.

6. The friction assembly according to claim 2, comprising means for condensing gases resulting from friction of the lining.

7. The friction assembly according to claim 1, wherein the gas filtration device comprises a canister.

8. The friction assembly according to claim 7, wherein the filtration device is capable of capturing gases of carbon dioxide and/or methane and/or nitrogen oxide and/or nitrogen dioxide and/or ethane and/or phenol and/or hexanol and/or heptane and/or cyclopentanone and/or an alkene.

9. The friction assembly according to claim 7, comprising a particulate filter in pneumatic communication with the collection groove and the hole, configured to filter air coming from the collection groove.

10. The friction assembly according to claim 7, comprising means for condensing gases resulting from friction of the lining.

11. The friction assembly according to claim 1, comprising a particulate filter in pneumatic communication with the collection groove and the hole, configured to filter air coming from the collection groove.

12. The friction assembly according to claim 11, wherein the particulate filter is pneumatically positioned between the collection groove and the filtration device.

13. The friction assembly according to claim 12, wherein the means for condensing gases resulting from friction of the lining are pneumatically positioned between the collection groove and the particulate filter.

14. The friction assembly according to claim 11, comprising means for condensing gases resulting from friction of the lining.

15. The friction assembly according to claim 1, wherein the filtration device is capable of capturing gases of carbon dioxide and/or methane and/or nitrogen oxide and/or nitrogen dioxide and/or ethane and/or phenol and/or hexanol and/or heptane and/or cyclopentanone and/or an alkene.

16. The friction assembly according to claim 15, comprising a particulate filter in pneumatic communication with the collection groove and the hole, configured to filter air coming from the collection groove.

17. The friction assembly according to claim 15, comprising means for condensing gases resulting from friction of the lining.

18. The friction assembly according to claim 1, wherein the plate heat exchanger is adapted to be supplied with a refrigerant fluid.

19. The friction assembly according to claim 1, wherein the means for condensing gases resulting from friction of the lining comprises a plate heat exchanger.

* * * * *